(12) United States Patent
Siomina et al.

(10) Patent No.: US 10,123,376 B2
(45) Date of Patent: Nov. 6, 2018

(54) METHOD AND APPARATUS FOR CONTROLLING THE ACTIVITY STATE OF A WIRELESS DEVICE HAVING DEVICE-TO-DEVICE COMMUNICATION CAPABILITIES

(71) Applicant: Telefonaktiebolaget L M Ericsson (publ), Stockholm (SE)

(72) Inventors: Iana Siomina, Täby (SE); Muhammad Kazmi, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 59 days.

(21) Appl. No.: 14/652,733

(22) PCT Filed: May 7, 2015

(86) PCT No.: PCT/SE2015/050509
§ 371 (c)(1),
(2) Date: Jun. 16, 2015

(87) PCT Pub. No.: WO2015/171063
PCT Pub. Date: Nov. 12, 2015

(65) Prior Publication Data
US 2016/0286601 A1    Sep. 29, 2016

Related U.S. Application Data

(60) Provisional application No. 61/990,197, filed on May 8, 2014.

(51) Int. Cl.
*H04W 76/28* (2018.01)
*H04W 76/14* (2018.01)
(Continued)

(52) U.S. Cl.
CPC ....... *H04W 76/28* (2018.02); *H04W 28/0278* (2013.01); *H04W 76/14* (2018.02);
(Continued)

(58) Field of Classification Search
None
See application file for complete search history.

(56) References Cited

U.S. PATENT DOCUMENTS 8,971,223 B2 *   3/2015   Bornstein ......... H04W 52/0251
                                                         370/311
9,414,306 B2 *   8/2016   Han .................. H04W 36/0066
(Continued)

FOREIGN PATENT DOCUMENTS

EP    2785130 A1    10/2014
GB    2483752 A  *  3/2012  ............ H04W 4/005
(Continued)

OTHER PUBLICATIONS

3GPP, "3rd Generation Partnership Project; Technical Specification Group Services and System Aspects; Feasibility study for Proximity Services (ProSe) (Release 12)", 3GPP TR 22.803 V12.2.0, Jun. 2013, 1-45.
(Continued)

*Primary Examiner* — Andrew Lai
*Assistant Examiner* — Jamaal R Henson
(74) *Attorney, Agent, or Firm* — Murphy, Bilak & Homiller, PLLC

(57) ABSTRACT

According to the teachings herein, network and device methods and apparatuses provide Device-to-Device, D2D, activity state control of a first wireless device with respect to a current or pending D2D transmission by a second device. In an example application, the teachings herein disclose a wireless communication network advantageously adjusting the D2D activity state of a given wireless device, to enable
(Continued)

it to receive critical or otherwise desired D2D transmissions by another device, where such transmissions might otherwise be missed if D2D operation by the given wireless device continued according to the unadjusted D2D activity state.

10 Claims, 6 Drawing Sheets

(51) Int. Cl.
*H04W 76/20* (2018.01)
*H04W 28/02* (2009.01)
*H04W 52/02* (2009.01)

(52) U.S. Cl.
CPC .......... *H04W 76/20* (2018.02); *H04W 52/028* (2013.01); *Y02D 70/00* (2018.01); *Y02D 70/1262* (2018.01); *Y02D 70/146* (2018.01); *Y02D 70/164* (2018.01); *Y02D 70/21* (2018.01); *Y02D 70/22* (2018.01); *Y02D 70/24* (2018.01); *Y02D 70/25* (2018.01); *Y02D 70/26* (2018.01)

(56) References Cited

U.S. PATENT DOCUMENTS

| | | | | |
|---|---|---|---|---|
| 2010/0074203 A1* | 3/2010 | Pani | ................ | H04W 72/0413 370/329 |
| 2011/0256896 A1* | 10/2011 | Giaretta | ................ | H04W 4/00 455/509 |
| 2011/0268004 A1* | 11/2011 | Doppler | ................ | H04W 72/02 370/311 |
| 2013/0034035 A1* | 2/2013 | Kazmi | ................ | H04W 56/0085 370/311 |
| 2013/0165101 A1* | 6/2013 | Han | ................ | H04W 76/046 455/418 |
| 2013/0212219 A1* | 8/2013 | Koskela | ................ | H04W 76/28 709/217 |
| 2013/0229931 A1* | 9/2013 | Kim | ................ | H04W 24/10 370/252 |
| 2013/0301500 A1* | 11/2013 | Koc | ................ | H04W 76/048 370/311 |
| 2014/0162643 A1 | 6/2014 | Lee et al. | | |
| 2014/0269668 A1* | 9/2014 | Zhu | ................ | H04J 3/07 370/350 |
| 2015/0327312 A1* | 11/2015 | Burbidge | ................ | H04W 72/14 370/329 |

FOREIGN PATENT DOCUMENTS

| | | | |
|---|---|---|---|
| WO | 2010025774 A1 | 3/2010 | |
| WO | 2010082114 A1 | 7/2010 | |
| WO | WO 2010082114 A1 * | 7/2010 | ............ H04W 72/02 |
| WO | 2010116220 A1 | 10/2010 | |
| WO | 2014163372 A1 | 10/2014 | |

OTHER PUBLICATIONS

Asadi, Arash et al., "A Survey on Device-to-Device Communication in Cellular Networks", IMDEA Networks Institute, Madrid, Spain, Apr. 24, 2014, 1-18.
Asadi, Arash et al., "WiFi Direct and LTE D2D in Action", Wireless Days (WD), 2013 IFIP, Valencia, Spain, Nov. 13-15, 2013, 1-8.
Brydon, Alastair, "Opportunities and threats from LTE Device-to-Device (D2D) communication", available online at http://www.unwiredinsight.com/2014/lte-d2d, retrieved on May 6, 2014, Feb. 28, 2014, 1-8.
Choi, Sunghyun, "D2D Communication: Technology and Prospect", Multimedia & Wireless Networking Lab, Department of Electrical & Computer Engineering, Seoul National University, 2013, 1-34.
Fodor, Gábor et al., "Design Aspects of Network Assisted Device-to-Device Communications", IEEE Communications Magazine, May 2011, 1-8.
Li, Zhe, "Performance Analysis of Network Assisted Neighbor Discovery Algorithms", KTH Electrical Engineering, Degree Project in Automatic Control, Second Level, Stockholm, Sweden, XR-EE-RT 2012:026, 2012, 1-64.
Lin, Xingqin et al., "An Overview on 3GPP Device-to-Device Proximity Services", IEEE Communications Magazine, Apr. 2014, 1-19.
Unknown, Author, "LTE Release 12—Taking Another Step Toward the Networked Society", Ericsson White Paper, Jan. 2013, 1-12.

* cited by examiner

METHOD AND APPARATUS FOR CONTROLLING THE ACTIVITY STATE OF A WIRELESS DEVICE HAVING DEVICE-TO-DEVICE COMMUNICATION CAPABILITIES

TECHNICAL FIELD

The present invention relates to wireless communication networks, such as used to provide cellular communication services to compatible devices, and particularly relates to controlling wireless devices having device-to-device communication capabilities.

BACKGROUND

FIG. 1 illustrates an example of two wireless devices using a "direct mode" of communication, based on the two devices being in relatively close proximity to one another. In an example case, the two devices are referred to as User Equipments, or UEs. Each UE is configured for operation in a Third Generation Partnership Project, 3GPP, communication network, e.g., a cellular communication network based on the Long Term Evolution, LTE, specifications. Further, each device is configured for Device-to-Device, D2D, communications, which allows each device to talk to other devices having compatible D2D communication capabilities. D2D communications may be network-assisted when one or both devices are operating within the coverage of the cellular network.

FIG. 2 illustrates a variation on D2D communications between the two devices. This variation is referred to as "locally-routed" communications, in that the signaling between the two devices is conveyed through a serving base station—eNodeB in LTE. However, unlike conventional cellular communication signaling between two devices, the signaling is not routed through the default path, which includes the "core network" of the supporting cellular communication network. See FIG. 3 for an example of this conventional default-path routing case, where signaling between two UEs is communicated through serving gateway/packet gateway, SGW/PGW, nodes in a Core Network, CN, that is associated with the Radio Access Network, RAN, which is represented by the eNodeBs and supports the two UEs.

In D2D communications, the communication source and the target are wireless devices, e.g., UEs. D2D communication offers a number of advantages, such as offloading of the cellular network, faster communication, increased awareness of surrounding wireless devices of interest, e.g., a given device may be made aware of surrounding devices running the application or applications, higher-quality links due to a shorter distance, etc. Some appealing applications of D2D communications are video streaming, online gaming, media downloading, peer-to-peer, P2P, file sharing, etc.

FIG. 4 illustrates a reference architecture for D2D operations, where "ProSe" denotes "Proximity Services," and indicates services available via D2D communication between devices in proximity to one another. See the 3GPP Technical Reference, TR 22.803, Feasibility study for Proximity Services, ProSe, for example details regarding this architecture, and the above-described direct communications, locally routed communications, and default-path communications. Further, in the context of FIG. 4, "APP" denotes application, "E-UTRAN" denotes an Evolved Universal Terrestrial Radio Access Network, as used for the radio access part of LTE. "EPC" denotes Evolved Packet Core, as used for the core network part of LTE.

Certain levels of awareness or management of network operations with respect to D2D operations are known. See, for example, WO 2014/163372 A1 to Samsung Electronics Co., Ltd., which interrelates certain network states defined by an Enhanced Packet System, EPS, network, with D2D initiations at a terminal. Further, U.S. Pub. No. 2014/0162643 A1 to Lee discloses a method for executing a D2D communication in a D2D apparatus, such as a terminal. In Lee, the apparatus transmits a server designation request message to a base station, requesting registration as a server terminal, and then transmits D2D-related service information on radio resources allocated by the base station.

However, numerous challenges attend the effective integration of D2D communications capability into the overall communication system framework. For example, it is recognized herein that "Discontinuous Reception" or DRX presents a number of challenges and opportunities with respect to D2D-capable wireless devices. DRX was introduced as a key solution for conserving battery power in wireless devices operating within a wireless communication network.

In the LTE example case, DRX is characterized by the following: DRX is a per UE mechanism, as opposed to being a per radio bearer mechanism; and DRX may be used in RRC_IDLE and RRC_CONNECTED states. In the RRC_CONNECTED state, the eNodeB/UE may initiate the DRX mode when there are no outstanding or new packets to be transmitted or received. In the RRC_IDLE state, 2G and 3G devices use DRX in idle state to increase battery lifetime. Notably, however, the HSPA and LTE standards allow DRX for the connected state. The available DRX values are controlled by the network and start from no DRX up to DRX intervals of x seconds.

Hybrid Automatic Repeat reQuest or HARQ operations related to data transmission are independent of DRX operation, and a given UE or other compatible device wakes up to read the Physical Downlink Control Channel, PDCCH, for possible retransmissions and/or ACK/NAK signaling, regardless of the DRX configuration in use. In the downlink, a timer limits the time a UE remains awake awaiting a retransmission and when DRX is configured, the UE may be further configured with an "on-duration" timer during to control the time the UE monitors the PDCCH(s) for possible allocations.

In a further aspect of DRX, when a UE is configured to use DRX, the UE can send periodic Channel Quality Indicator, CQI, reports back to its supporting network during its "active times". Radio Resource Control, RRC, operations can further restrict periodic CQI reports, so that they are only sent during the on-duration. An eNodeB does not transmit packets to a UE when the UE is in sleep mode.

DRX during the RRC_CONNECTED mode operation of a UE should not be confused with DRX during IDLE mode operation of a UE. A UE enters, or is configured to enter, IDLE mode after a prolonged time of air interface inactivity. IDLE-mode DRX is also known as paging DRX, because the DRX duration can be understood as representing the time the mobile device can go to sleep between two paging messages that could contain a command for the UE to wake up again and change back to RRC_CONNECTED state. IDLE-mode DRX is much less fine grained and is measured in hundreds of milliseconds or even seconds.

A number of parameters control or otherwise relate to DRX. For example, "on-duration" is the duration in downlink subframes that a UE waits to receive PDCCH transmissions after waking up from DRX. If the UE successfully decodes a PDCCH, it stays awake and starts an inactivity timer. In turn, the inactivity timer defines the duration in downlink subframes that the UE waits to successfully decode a PDCCH, from the last successful decoding of a PDCCH. Failing any such successful decoding, the UE re-enters DRX. Further, the UE restarts the inactivity timer following a single successful decoding of a PDCCH, for a first transmission only—i.e., the inactivity timer is not restarted for retransmissions.

The "active time" is another DRX parameter of interest and it defines the total duration that a UE is awake over a DRX cycle. This awake or on-time represents the time during which the UE performs continuous reception while the inactivity timer has not expired and the time the UE performs continuous reception while waiting for a downlink retransmission after one HARQ Round Trip Time or RTT. Based on these details, the minimum active time is of a length equal to the on-duration, and the maximum active is undefined, i.e., infinite.

Of the above parameters the on duration and inactivity timer are of fixed lengths, while the active time is of varying lengths based on scheduling decisions and the failure or success of UE decoding. Only the on duration and the inactivity timer duration are signaled to the UE by the eNodeB. Further, only one DRX configuration is applied in the UE at any given time, and the UE applies the on duration upon waking up from a DRX sleep.

FIG. 5 illustrates DRX mode in the example case of LTE. As can be seen from FIG. 5, the UE activity time may be extended if PDCCH is received during the on-duration time of the UE. However, the activity time of the UE also may be shortened by the network sending a MAC DRX command to the UE, whereupon the UE stops the on-duration time and DRX inactivity timer. If the PDCCH is not successfully decoded during the on duration, the UE shall follow the DRX configuration—i.e., the UE can enter DRX sleep if allowed by the DRX configuration. This behavior also applies for the sub-frames where the UE has been allocated predefined resources.

If the UE successfully decodes a PDCCH for a first transmission, the UE shall stay awake and start the inactivity timer until a MAC control message tells the UE to re-enter DRX, or until the inactivity timer expires. This behavior holds even if a PDCCH is successfully decoded in sub-frames where the UE has also been allocated predefined resources, and in both cases the DRX cycle that the UE follows after re-entering DRX is given by the following rules.

First, if a short DRX cycle is configured, the UE first follows the short DRX cycle and after a longer period of inactivity, the UE follows the long DRX cycle. Note that the long DRX cycle will be a multiple of the short DRX cycle, if the short DRX cycle is used. If the short DRX cycle is not configured, the UE directly follows the long DRX cycle. Durations for long and short DRX cycles are configured by the RRC and the transitions between the short and long DRX cycles is determined by the UE based on the activity timer, or based on the eNodeB sending MAC commands to the UE. For example, if the MAC command is received and the short DRX cycle is configured, the UE will start or restart its short-cycle timer, drxShortCycleTimer, and use the short DRX cycle.

The network configures a number of parameters for DRX operation by a UE, such as the on-duration timer, referred to as onDurationTimer. The duration is specified in terms of the number of PDCCH subframes and may be any of: 1, 2, 3, 4, 5, 6, 8, 10, 20, 30, 40, 50, 60, 80, 100, and 200. The network can also configure the inactivity timer used by the UE, referred to as the DRX-InactivityTimer. The duration of this timer is also specified in terms of PDCCH subframes, and may be any one of: 1, 2, 3, 4, 5, 6, 8, 10, 20, 30, 40, 50, 60, 80, 100, 200, 300, 500, 750, 1280, 1920, 2560. A specific value may also be configured if the UE supports In-Device Coexistence or IDC.

The network also may configure the long DRX cycle start offset, denoted as longDRX-CycleStartOffset. The value of this parameter depends on cycle length, but it is specified in terms of subframes and may have a value up to 2559. Conversely, the short cycle parameter, shortDRX-Cycle, specifies the duration of the short DRX cycle in terms of subframes and can have values of any of: 2, 5, 8, 10, 16, 20, 32, 40, 64, 80, 128, 160, 256, 320, 52, 640.

When a DRX cycle is configured, the active time of the UE includes the time while the onDurationTimer or drx-InactivityTimer or drx-RetransmissionTimer or mac-ContentionResolutionTimer is running, or the time during which a Scheduling Request is sent on PUCCH and is pending, or the time during which an uplink grant for a pending HARQ retransmission can occur and there is data in the corresponding HARQ buffer, or a PDCCH indicating a new transmission addressed to the Cell Radio Network Temporary Identifier, C-RNTI, of the UE has not been received after successful reception of a Random Access Response for the preamble not selected by the UE.

Generally, new transmissions can only take place during the active time, so that when the UE is waiting for one retransmission only, it does not have to be "awake" during the RTT. When the UE is not in an active time, type-0-triggered Sounding Reference Signals, SRS, shall not be reported. Further, if CQI masking, cqi-Mask, is set up by upper layers, then, when the on-duration timer is not running, CQI/PMI/RI/PTI shall not be reported on the Physical Uplink Control Channel, PUCCH. Here, PMI denotes Precoding Matrix Indicator, RI denotes Rank Indicator, and PTI denotes Precoding Type Indicator. Thus, cqi-Mask effectively limits CQI/PMI/PTI/RI reporting to the on-duration period of the DRX cycle, and the same value applies for all serving cells of the UE. That is, the involved functionality is common across serving cells and not performed independently for each cell.

Among the several exceptions, however, regardless of whether a UE is monitoring PDCCH or not, the UE receives and transmits HARQ feedback and transmits type-1-triggered SRS when such transmissions are expected. Further, a UE may optionally choose not to send CQI/PMI/RUPTI reports on PUCCH and/or type-0-triggered SRS transmissions for up to four subframes following a PDCCH indicating a new uplink or downlink transmission, as received in subframe n-i, where n is the last subframe of the current active time window and i is an integer value from 0 to 3.

After the active time is stopped because of the reception of a PDCCH or a MAC control element, the UE may optionally choose to continue sending CQI/PMI/RI/PTI reports on PUCCH and/or SRS transmissions for up to four subframes. The choice not to send CQI/PMI/RI/PTI reports on PUCCH and/or type-O-triggered SRS transmissions is not applicable for subframes where the on-duration timer is running, nor is the choice applicable for subframes n-i to n.

As is recognized herein, there currently is no possibility for a network to control the network activity state of a receiving or target D2D UE, while accounting for the D2D activity of the UE.

SUMMARY

According to the teachings herein, network and device methods and apparatuses provide Device-to-Device, D2D, activity state control of a first wireless device with respect to a current or pending D2D transmission by a second device. In an example application, the teachings herein disclose a wireless communication network advantageously adjusting the D2D activity state of a given wireless device, to enable it to receive critical or otherwise desired D2D transmissions by another device, where such transmissions might otherwise be missed if D2D operation by the given wireless device continued according to the unadjusted D2D activity state.

In one embodiment, a method implemented by a network node in a wireless communications network includes identifying a first wireless device as a target for D2D activity state control with respect to a current or pending D2D transmission by a second wireless device. In this context the first wireless device is registered in the wireless communication network and has network communications capabilities and D2D communications capabilities. The method further includes determining a D2D activity state adjustment for the first wireless device, and controlling the D2D activity state of the first wireless device according to the determined D2D activity state adjustment.

In a related embodiment, a network node is configured for operations in a wireless communications network and includes a communication interface and a processing circuit operatively associated with the communication interface. The communication interface is configured for communicating with at least one of wireless devices operating in the wireless communication network and one or more other network nodes in the wireless communication network. At least one such other network node is configured for communicating directly or indirectly with wireless devices operating in the wireless communication network.

The processing circuit is configured to identify a first wireless device as a target for activity state control with respect to a current or pending D2D transmission by a second wireless device. As above, the first wireless at issue here is registered in the wireless communication network and has network communications capabilities and D2D communications capabilities. The processing circuit of the network node is further configured to determine a D2D activity state adjustment for the first wireless device, in response to the identification operation, and to control the D2D activity state of the first wireless device according to the determined D2D activity state adjustment.

In another embodiment, a method at a wireless device of adjusting the D2D activity state of the wireless device with respect D2D communications includes controlling a D2D activity state of the wireless device. In one aspect of that control, the method includes receiving signaling indicating a D2D activity state adjustment for the wireless device, adjusting the D2D activity state of the wireless device, in response to receiving the signaling, and operating according to the D2D adjusted activity state.

In the above context, it will be understood that the wireless device is configured for network communications in which the wireless device communicates with a wireless communication network according to defined network communication protocols. Further, the wireless device is configured for D2D communications in which the wireless device communicates with one or more other wireless devices according to defined D2D communication protocols.

In a corresponding embodiment, a wireless device comprises a communication interface configured for network communications, wherein the wireless device wirelessly communicates with one or more network nodes in a wireless communication network using defined network communication protocols, and configured for D2D communications, wherein the wireless device wireless communicates with one or more other wireless devices using defined D2D communication protocols. The wireless device also includes a processing circuit that is operatively associated with the communication interface and configured to perform network and D2D communications according to the respectively defined network and D2D communication protocols. More particularly, the processing circuit is configured to control an activity state of the wireless device. In one aspect of that control, the processing circuit is configured to receive, via the communication interface, signaling indicating a D2D activity state adjustment for the wireless device. The processing circuit is further configured to adjust the D2D activity state of the wireless device, in response to receiving the signaling, and operate according to the adjusted D2D activity state.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
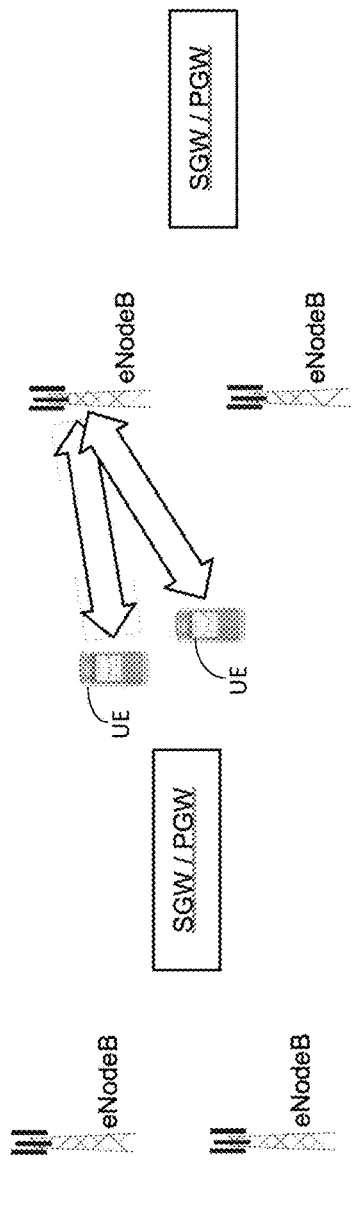
FIG. 1 is a block diagram illustrating a "direct mode" data path in Device-to-Device, D2D, communications between two wireless devices.
Figure 2:
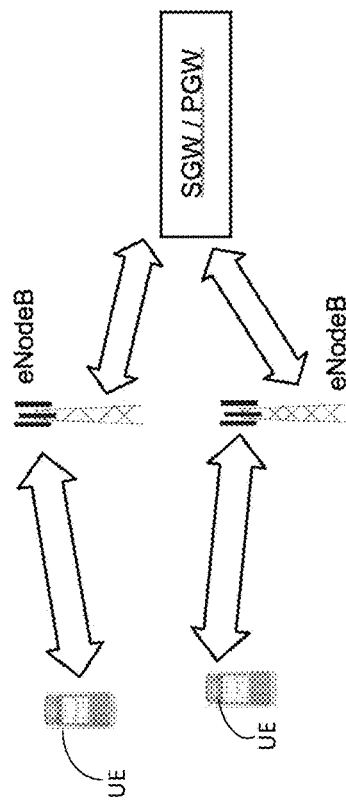
FIG. 2 is a block diagram illustrating a "locally routed" data path for D2D communications between two wireless devices.
Figure 3:
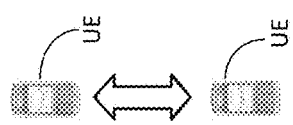
FIG. 3 is a block diagram illustrating a "default" data path between two wireless devices, based on network communications rather than D2D communications.
Figure 4:
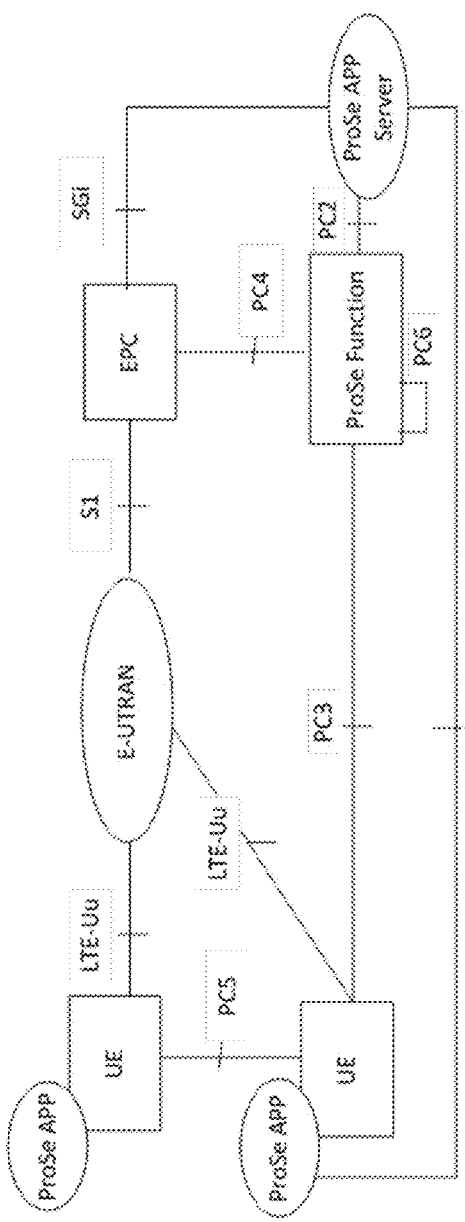
FIG. 4 is an example network architecture that incorporates D2D functionality.
Figure 5:
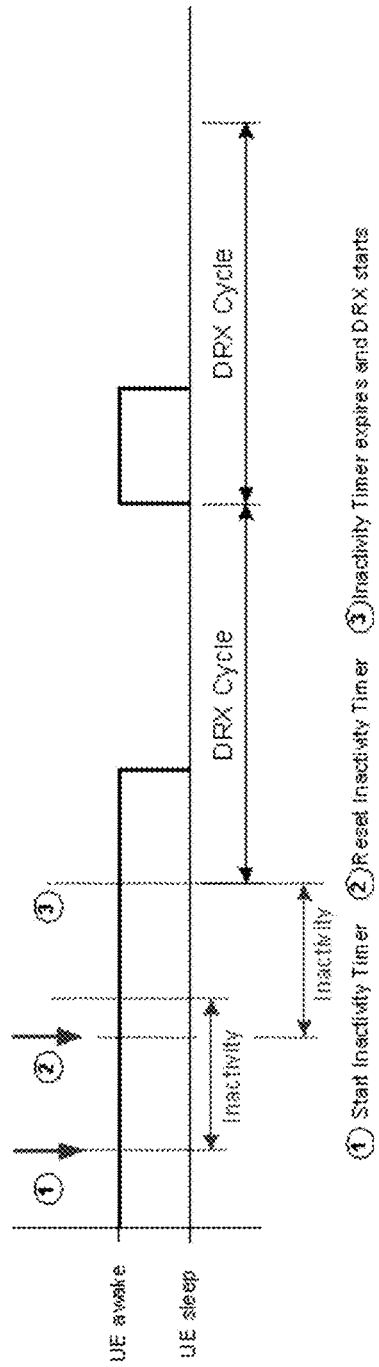
FIG. 5 is a diagram illustrating Discontinuous Reception, DRX, in a Long Term Evolution, LTE, context.

In the various examples used for illustration in this disclosure, the terms "D2D" and "Proximity Services" or "ProSe" may be used interchangeably. Further, unless explicitly noted or apparent from the content, no distinction is implied between the terms "D2D device" and "D2D UE". Unless otherwise noted or apparent from the context, both terms refer to essentially any type of wireless communication device or apparatus that is configured for receiving and/or transmitting radio signals on a direct radio link with another D2D entity. Non-limiting examples include a cellular UE, a Portable Digital Assistant or PDA, a tablet or laptop computer, a sensor, a relay, and event certain network base stations employing a UE-like interface. D2D-capable devices support one or more type of D2D operations.

Here, a "D2D operation" comprises any action or activity related to D2D. Example D2D operations include transmitting or receiving a signal/channel type for D2D purposes, transmitting and/or receiving data by means of D2D communication, transmitting and/or receiving control or assistance data from another D2D device for D2D purposes, transmitting and/or receiving a request for control or assistance data for D2D operations, selecting a D2D operation mode, initiating/starting D2D operations, switching to a D2D operation mode from a cellular operation mode, or configuring a receiver or transmitter with one or more parameters for D2D operation. Notably, any given D2D operation may be for a commercial purpose or to support public safety, using the data related to D2D. D2D operations may or may not be specific to a certain D2D service.

Similarly, a "D2D transmission" is a transmission of any one or more types of radio signals by a D2D device. Non-limiting examples of D2D transmissions include the transmission of reference signals, synchronization signals, control channels, data channels, broadcast channels, paging channels, etc. A D2D transmission on a direct radio link is intended for reception by another D2D device and such transmissions may be unicast, multicast, groupcast, or broadcast transmissions. Broadly, D2D transmissions are any transmission from one D2D entity intended for reception by one or more other D2D entities, and example transmissions include transmitting on physical and/or logical channels, including dedicated channels and/or shared or common channels.

As for the "activity state" of a D2D device, examples of the activity state configuration include one or more DRX-related parameters for D2D DRX, cellular DRX, or joint DRX involving DRX with respect to a network and with respect to D2D. Similarly, the activity state may be defined by or include settings for one or more Discontinuous Transmission, DTX, related parameters that control DTX with respect to D2D communications, cellular or other network communications, or both D2D and network communications.

As another definitional point, a "coordinating node" as contemplated in this disclosure is a node that schedules, decides, at least in part, or selects time-frequency resources to be used for at least one of: network, e.g., cellular, transmissions and D2D transmissions. The coordinating node may also provide the scheduling information to another node, such as another D2D device, a cluster head, a radio network node, such as an eNodeB, or another network node, such as a "Core Network" or CN node in the CN of a wireless communication network. A coordinating node communicates with one or more other entities, such as with a radio network node in the radio access part of a cellular or other wireless communication network.

In many instances, such networks operate in licensed radio spectrum, or at least operate according to defined spectrum usage regarding uplink and downlink communications. At least some of the embodiments herein contemplate that the uplink spectrum of the wireless communication network is used, at least in part, for D2D transmissions, e.g., a Frequency Division Duplex or FDD arrangement. More broadly, D2D transmissions in one or more embodiments herein use a portion of the uplink resources—e.g., time and frequency resources—of a wireless communication network for D2D communications. Of course, the teachings herein are not limited to cases where D2D communications use the uplink resources of a wireless communication network, nor are the teachings herein limited to use with networks that operate in any particular spectrum, licensed or otherwise.

However, by way of non-limiting example, the teachings herein are applicable to cellular communication networks configured according to the LTE standards, for FDD and TDD modes of operation. Correspondingly, many of the examples described herein use LTE terminology and are cast in the example framework of the LTE Radio Access Technology or RAT. However, these teachings are not limited to LTE networks, and also apply to Universal Terrestrial Radio Access or UTRA networks, CDMA networks, such as cdma2000, WiMAX networks, GSM networks, and to essentially any type of network that employs one or more RATs for cellular operation.

As for a "network node" configured to carry out all or a portion of the network-side teachings disclosed herein, such a node may be in the radio portion of the involved network—i.e., it may be a radio network node, such as a base station. Non-limiting examples of a radio network node as contemplated herein include a radio base station, a relay node, an access point, a cluster head, a Radio Network Controller or RNC, etc.

However, the network node may be elsewhere within the overall network, such as in the CN portion of the network, and may not be a "radio" node. Examples where the contemplated network node is not a radio network node include a Mobility Management Entity or MME node that at least partially controls the mobility of wireless devices operating within the network. In other examples, the contemplated network node is a Self-Organizing Network or SON node, or an Operations & Maintenance, O&M, node. In other examples, the contemplated network node is some other type of server, such as an applications server or a D2D server, which may have partial or full D2D capabilities.

In an example of the contemplated network node, the node is configured to obtain the information about a current or pending D2D transmission by a second D2D UE, and to determine one or more "target" D2D UEs. Here, a "target" UE is a UE that is identified as a target for D2D activity state adjustment, with respect to the current or pending D2D transmission by the second D2D UE. For example, the current or pending D2D transmission by the second D2D UE is of particular or general relevance to the target D2D UEs. Advantageously, The network node controls the D2D activity state of at least one determined target D2D UE with respect to the current or pending D2D transmission. It may be noted that if the current or pending D2D transmission is a D2D broadcast by the second D2D UE, then the one or more target D2D UEs may be any UEs within the corresponding coverage area, or a subset of any such UEs.

As for obtaining the information about current or pending D2D transmission, the contemplated network node in some embodiments obtains the information according to any one or more of the following examples: (1) based on an indication or a message indicative of an ongoing or an upcoming D2D transmission by the second D2D UE, such as the intention of the second D2D UE to transmit, received from the second D2D UE or from another network node or from another wireless device; (2) based on the scheduling information for transmissions by the second D2D UE, where the scheduling may be performed by the network node, e.g., upon a request from the second D2D UE, or upon a request from another network node, or may be performed by a second network node, the second D2D UE, or by another wireless device; (3) based on an indication of one or more discovered D2D transmitters, e.g., as received from the first D2D UE, a network node, or another UE; (4) based on indication received from one or more D2D UEs that they are performing or are expected to start D2D transmissions; and (5) based on information that one or more D2D transmissions take place at one or more pre-determined times.

For Item (5) in the above example listing, such information may be obtained by the network node based on one or more of: a pre-defined rule or information or historical data or information received from a D2D UE or from another network node. Additionally, or alternatively, certain D2D transmissions occur according to a pre-defined pattern, which may be periodic with a certain periodicity, e.g. over K subframes or L time units every M radio frames, where, for example, K and M can be 5 and 4, respectively. For Item (1) in the above example listing, the indication of an ongoing or upcoming D2D transmission may be in the form of a request for resource allocations for a D2D operation or a scheduling request for D2D operations, a received buffer status report, e.g., which at least indirectly indicates a forthcoming D2D transmission by the reporting device, a received message indicating that a particular D2D transmitter is transmitting or that it may, or will, begin transmitting.

Determining the one or more target D2D UEs, i.e., the UEs subject to activity state control, involves the network node determining, for example, the one or more target D2D UEs that are or may be interested in a current or pending D2D transmission as being all UEs within the coverage area of the D2D transmission, e.g., for a D2D broadcast case. In another example, the network node identifies a subset of UEs as being targeted, e.g., in a groupcast case. In still other cases, the network node identifies a specific UE as being targeted, e.g., in a unicast case.

The target D2D UE(s) may be in active or connected state or mode, e.g. in the RRC_CONNECTED state, or they may be in an idle state or mode, e.g., in the RRC_IDLE state. When in the idle state, UEs operate in DRX. In the connected state, a UE can be in a long inactivity state, such as when the UE is configured with a long DRX cycle, e.g., a DRX cycle of 640 ms. A target D2D UE may have indicated to the network that it is interested in receiving D2D transmissions. Such an indication may be sent by any given UE when initially connecting to or registering with the network, for example, or the indication can be later signaled from the UE to the network. In any case, it will be appreciated that the network node in one or more example embodiments has access to UE-specific information that indicate whether a given UE is or is not "interested" in receiving D2D transmissions.

Additionally, or alternatively, the determination of target UEs is based on any one or more of: Group ID of the group to which the target D2D UEs belong; an Area ID of the area in which the target D2D UEs are located or are expected to be located; a Cell ID of the serving cell of the target D2D UEs, e.g., a Physical cell ID or PCI and/or a Cell Global ID or CGI; the location of the target D2D UEs. The determination may also be based on an indication or message received by the network node from another network node. For example, the other network node informs the network node of target D2D UEs within its vicinity.

As for controlling the D2D activity state of a target D2D UE, i.e., to account for D2D operation by the target D2D UE, a network node as contemplated herein controls the D2D activity state of a given D2D UE based on any one or more of: indicating to the target D2D UE the need to change to a more active D2D activity state, e.g., from DRX sleep to DRX active, from periodic activity to continuous activity, from less frequent activity periods to more frequent, from shorter active periods to longer active periods, and from a DRX cycle of longer length to another DRX cycle of a shorter length.

In general, the target D2D UE may be controlled to: (a) wake up its receiver and/or transmitter from the OFF state to the ON state at least over certain time duration; (b) change its periodic activity/inactivity state configuration, such as by changing the target D2D UE's DRX configuration such as on-duration time or inactivity timer; (c) change from DRX to non-DRX or continuous operation; (d) change the D2D operation range of the target D2D UE, such as by lowering the received signal threshold for receiving D2D signals and thereby enabling the UE to "hear" more of its D2D neighbors and generally leading to more frequent and/or longer listening by the UE; (e) change the length or periodicity of the DRX cycle used by the UE from a longer value to a shorter value, e.g., from 640 ms to 40 ms.

For indicating to a target D2D UE that it needs to adjust its D2D activity state, the network node may provide the indication by means of transmitting a message, a pre-defined radio signal, or other implicit indication to the UEs identified as the one or more target D2D UEs. Notably, the type or nature of the D2D activity state change made at the one or more target D2D UEs may depend on the indication contents, such as where the indication explicitly indicates the nature or the type of the D2D operation giving rise to the D2D activity state adjustment. For example, if the indication indicates that the current or pending D2D transmission is a transmitted warning about an emergency or a disaster situation, the target D2D UE(s) may disregard their current DRX/DTX settings and go into continuous operation, or may shorten their DRX/DTX intervals—meaning that they become more active in the D2D reception and/or transmission sense but do not necessarily stop DRX/DTX operation altogether.

The indication also may adapt, or include information allowing the receiving UE to adapt, its active state configuration specifically with reference to the D2D operation(s) of the D2D transmitter involved in the D2D transmission(s) at issue.

In one such example, the network node keeps the target D2D UE(s) active over the time window during which the D2D transmitter will transmit or is expected to transmit. In another example, the network node further prolongs the active state(s) of the target D2D UE(s) in cases where the D2D transmitter will continue to transmit or is expected to continue to transmit.

In general, the activity state control or configuration may be carried in the indication itself, or sent separately, e.g., in another message, or the target D2D UEs may be configured to follow a rules-based activity adjustment. Thus, the network node sends an indication that triggers a particular activity adjustment, as defined by the applicable rule or rules. Further, the transmission The transmission may also include an identity that can be used to identify the target D2D UE(s)—i.e., the contents of the indication allow receiving UEs to determine whether or not they are targeted. The network node may also send the transmission via another network node, such as through a base station or relay node. Example indication transmissions include physical radio signal transmissions, such as involving reference signals, discovery signals, pilot signals, synchronization signals etc., physical channel transmissions, such as done on data channels, broadcast channels, or any channel the targeted UEs are listening to, or by physical layer signaling, such as Layer 1 or L1 signaling on L1 control channels such as the Physical Downlink Control Channel or PDCCH. Example transmissions of the indication also include Medium Access Control or MAC signaling and Radio Resource Control or RRC signaling.

On the device side, a D2D UE is configured for operation in different activity states and/or at different levels of activity, such as periods during which its transmitter and/or receiver are active and periods during which its transmitter and/or receiver are inactive. Unless otherwise noted, it may be assumed that a UE that is said to be "inactive" is not able to receive D2D transmissions while inactive. However, as taught herein, the UE changes its D2D activity state or configuration responsive to receiving a message—e.g., a signal, indication, etc. The message may be received from the network, or from another UE.

The ability for the UE to receive network signaling and adjust its D2D activity state responsive to that signaling advantageously enables the network to control the D2D activity state of a given first UE or a group of given first UEs, based on an awareness at the network of current or pending D2D transmissions at one or more other given second UEs, that are determined to be of known or presumed interest to the first UE(s). Such an arrangement is particularly advantageous because the network is in a good position to detect current or pending D2D transmissions by given D2D UEs, identify one or more other given D2D UEs that are targets for increased D2D activity with respect to such D2D transmissions, and communicate directly or indirectly with the target UEs, to make corresponding D2D activity state adjustments at the target UEs.

Figure 6:
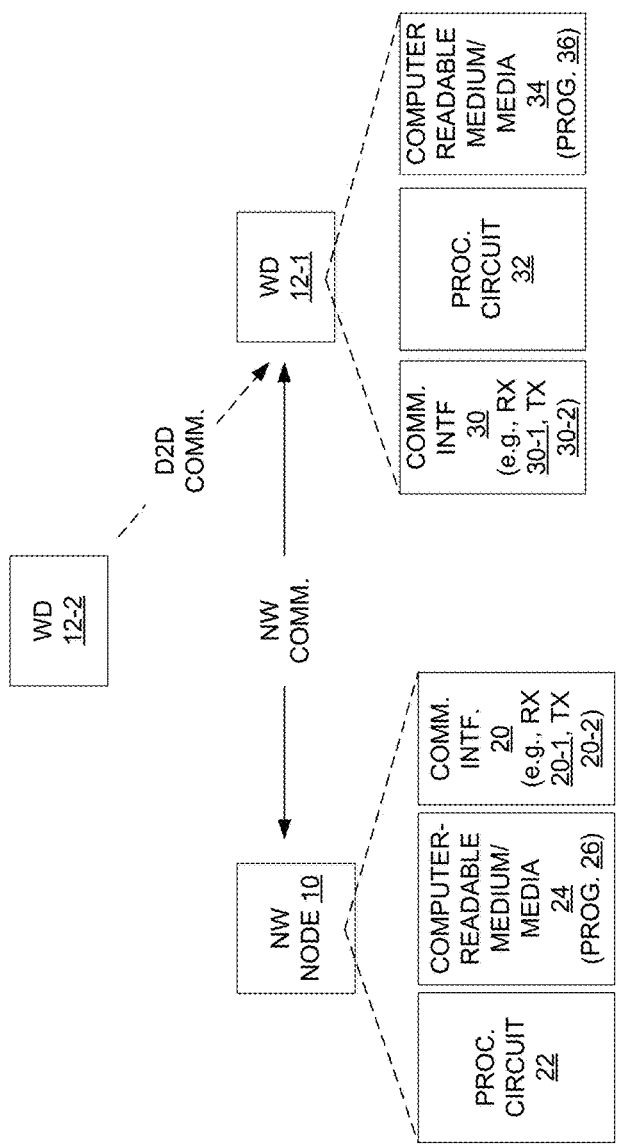
FIG. 6 is a block diagram of one embodiment of a network node and a wireless device configured to implement activity state control as taught herein.

To better understand the above example features and advantages, FIG. 6 illustrates example details for one embodiment of a network node 10 and a wireless device 12-1, which is shown in context with another wireless device 12-2. By way of non-limiting example, the network node 10 comprises a radio base station or other node configured for operation in a wireless communication network, such as a cellular communication network configured according to the LTE specifications, or other Third Generation Partnership Project, 3GPP, specifications.

Correspondingly, the wireless device 12-1 is configured for operation in such a network, wherein it communicates with the network node 10 or other network nodes according to defined network communication protocols. The wireless device 12-1 is further configured for D2D operation, such as where it receives from and/or transmits to one or more other wireless devices 12, such as the other device 12-2, using defined D2D communication protocols. In a non-limiting example, the wireless device 12-1 comprises a 3GPP User Equipment or UE, and is configured for operation in a 3GPP communication network, such as an LTE-based cellular communication network.

The illustrated network node 10 is configured to implement the network-side processing disclosed herein for controlling the D2D activity state of the wireless device 12-1 with respect to a current or pending D2D transmission at one or more other D2D devices, e.g., the wireless device 12-2. Correspondingly, the illustrated wireless device 12-1 is configured to implement the device-side processing disclosed herein, for controlling its D2D activity state, responsive to receiving control signaling, e.g., from the network node 10. The wireless device 12-2 is shown for context in that it has D2D communications capability and may communicate with the wireless device 12-1 using D2D communications. Thus, the wireless device 12-2 is an example of a D2D device carrying out a current or pending D2D transmission that may be of interest to the wireless device 12-1.

The circuit arrangements depicted in FIG. 6 will be understood as example arrangements. The network node 10 and the wireless device 12-1 generally will include digital processing circuits, and associated memory or other computer-readable medium, for storing configuration data, operational or working data, and for storing computer program instructions. In at least some of the embodiments contemplated herein, the network-side and device-side functionality is realized at least in part through the programmatic configuration of digital processing circuitry in a network node 10 and in a wireless device 12, respectively, based on the execution by that circuitry of stored computer program instructions.

The example network node 10 includes a communication interface 20, a processing circuit 22 and an associated computer-readable medium or media 24, which may comprise one or more types of memory and/or storage devices, such as a mix of volatile, working memory and non-volatile configuration and program memory or storage. Example memory or storage devices include FLASH, EEPROM or Solid State Disk or SSD, for non-volatile storage, and DRAM or SRAM devices for volatile, working memory.

In at least one embodiment, the computer-readable medium 24 stores a computer program 26. In such embodiments, the network node 10 is at least partly configured to perform the network-side processing operations taught herein, based on its execution of computer program instructions comprising the stored computer program 26. Here, stored means "retained for future electronic retrieval," such as being stored for execution. The term thus encompasses retention in either nonvolatile or volatile memory.

Implementation of the communication interface 20 depends on the nature of the network node 10. In embodiments where the network node 10 is an LTE eNodeB or other radio base station, the communication interface 20 comprises radiofrequency receiver circuitry 20-1 and radiofrequency transmitter circuitry 20-2, for communicating with wireless devices 12 according to defined network communication protocols—i.e., according to defined air interface timing and signaling formats, as used by the type of communication network in which the network node 10 is configured to operate.

Figure 7:
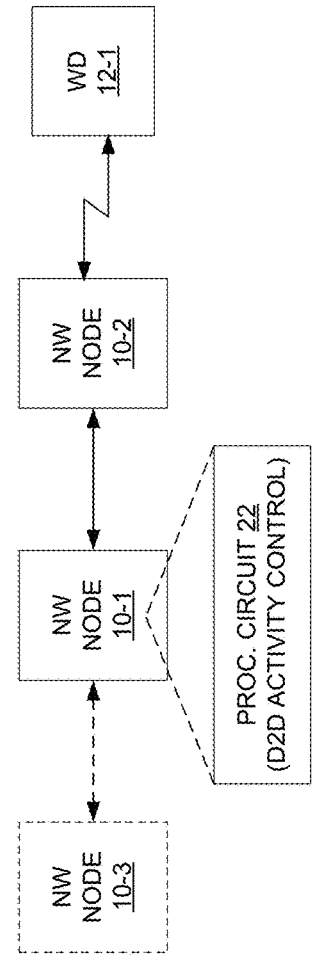
FIG. 7 is a block diagram of another embodiment of the network node introduced in FIG. 6.

In other embodiments, the network node 10 is a control node that communicates with eNodeBs or other radio base stations supporting the operation of wireless devices 12. For example, the network node 10 is a type of O&M node. Consider the example of FIG. 7, which identifies the network node 10 using the reference number 10-1 and illustrates the node 10-1 communicating with the wireless device 12-1 via another network node 10-2. This arrangement contrasts with the example of FIG. 6, which suggests a direct communication with the wireless device 12-1. FIG. 7 also indicates that the network node 10-1 may be in communication with another network node 10-3, but that possibility also holds for the example of FIG. 6. In some embodiments, the network node 10-1 receives information from other network nodes of the same or different node types regarding current or pending D2D transmissions, e.g., by wireless devices 12 not being served or controlled by the network node 10-1.

In one or more embodiments, the communication interface 20 includes more than one type of communication interface. Consider the case where the network node 10 comprises a radio base station. In such cases, the communication interface 20 includes a radio interface, e.g., receiver circuitry 20-1, transmitter circuitry 20-2, for communicating with wireless devices 12, and further includes an inter-base-station communication interface for communicating with other radio base stations, along with a core network communication interface for communicating with one or more nodes in an associated core network—e.g., for communicating with packet gateways, mobility and authentication management servers, etc. In an LTE example, the communication interface 20 would include an "X2" interface to other eNodeBs, and one or more "S1" interfaces to the LTE core network, which is referred to as an EPC or Evolved Packet Core.

The processing circuit 22 comprises, for example, digital processing circuitry that is fixed or programmed to perform network-side processing as taught herein. In one embodiment, the processing circuit 22 comprises one or more microprocessors, Digital Signal Processors, DSPs, ASIC, FPGAs, etc., which are configured according to the teachings herein. In one or more particular embodiments, the computer-readable medium 24 stores a computer program 26. Correspondingly, the processing circuit 22 is at least partly configured according to the teachings herein, based on its execution of the computer program instructions comprising the computer program 26.

Turning to the example wireless device 12-1, the device may be a cellular radiotelephone, such as a smartphone, feature phone, etc., a tablet or laptop computer, a network adaptor, card, modem or other such interface device, or essential device or other apparatus that is configured for wireless communication in the network 10, and further configured for D2D communications. In the 3GPP context, the wireless device 12-1 is referred to as a UE and it will be understood as including a communication interface 30, including a radiofrequency receiver circuitry 30-1 and a radiofrequency transmitter circuitry 30-2. This circuitry and the overall device 12-1 are configured for network communications according to the applicable network communication protocols, and are further configured for D2D communications according to the applicable D2D communication protocols.

The communication interface 30 may comprise a mix of analog and digital circuits. For example, the receiver 30-1 in one or more embodiments comprises a receiver front-end circuit, not explicitly shown in FIG. 6, that generates one or more streams of digital signal samples corresponding to antenna-received signals, and further includes one or more receiver processing circuits—e.g., baseband digital processing circuitry and associated buffer memory—which operate on the digital samples. Example operations include linearization or other channel compensation, possibly with interference suppression, and symbol demodulation/detection and decoding, for recovering transmitted information.

The wireless device 12-1 further includes a processing circuit 32 that is operatively associated with the communication interface 30. The processing circuit 32 includes or is associated with a computer-readable medium or media 34. The computer-readable medium 34 comprises, for example, a mix of volatile, working memory and non-volatile configuration and program memory. Non-limiting examples of the former include Static RAM or SRAM, while non-limiting examples of the latter include FLASH, EEPROM, and SSD storage.

The processing circuit 32 provides, for example, digital baseband processing for the receive, RX, signals and transmit, TX, data and control signals received and transmitted through the communication interface 30. The processing circuit 32 in this regard comprises digital processing circuitry and may be implemented as one or more microprocessors, DSPs, ASICs, FPGAs, etc. More generally, the processing circuit 32 may be implemented using fixed circuitry or programmed circuitry, or a mix of both. In an example embodiment, the computer-readable medium 34 stores a computer program 36. The processing circuit 32 in such embodiments is at least partly configured according to the teachings herein, based on its execution of the computer program instructions comprising the computer program 36.

Figure 8:
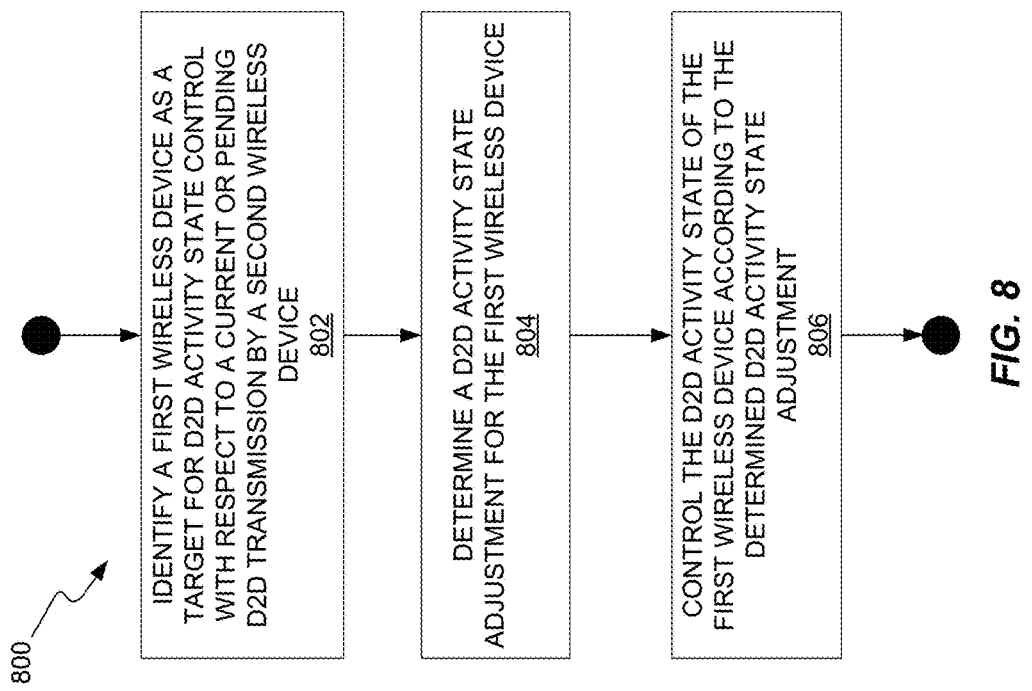
FIG. 8 is a logic flow diagram of one embodiment of a method of processing at a network node, for controlling the activity state of a wireless device with respect to D2D communications.

Regardless of its particular implementation details, the network node 10 is configured to implement a method 800, such as is shown in FIG. 8. The method 800 includes identifying (Block 802) a first wireless device 12-1 as a target for activity state control with respect to a current or pending D2D transmission by a second wireless device 12-2. Here, the first wireless device 12-1 will be understood as being registered in the wireless communication network in which the network node 10 is operating, and it will be understood to have network communications capabilities and D2D communications capabilities.

The wireless device 12-1 may be in a reduced-activity state with respect to D2D operation at the outset of the method 800, where "operation" is used here to denote the functioning of the first wireless device 12-1 in the context of D2D, and is not intended to denote a specific D2D event. As an example of D2D operation in a reduced-activity state, the wireless device 12-1 may be operating in a DRX mode with respect to D2D communications, where the particulars of that mode—e.g., DRX cycle time, etc.—are defined by the current values or settings of one or more activity-state parameters. While there may be degrees of activity reduction—i.e., different states or levels of reduced activity—a wireless device 12 may be considered to be in a reduced-activity state with respect to cellular and/or D2D communications whenever it operates with a reduced monitoring or awareness on the corresponding cellular and/or D2D communication link.

Thus, a reduced D2D activity state means, in an example sense, reduced D2D reception capabilities—e.g., reception is discontinuous or turned off. In this context, changing to a more active D2D state—increasing the D2D activity level—means increasing D2D reception capabilities, such as by changing to continuous reception, or by enabling D2D reception more frequently and/or for longer durations. In this example sense, then, a more active D2D state means that the wireless device 12 will, or is at least more likely, to have its receiver turned on for D2D reception, for receiving a D2D transmission by another D2D wireless device 12.

Thus, in one or more example embodiments, the D2D activity state or level at issue is defined by the DRX and/or DTX configuration of the wireless device 12, e.g., by the on-duration and/or cycle of DRX/DTX, which define the activity level of the wireless device 12 with respect to the downlink and uplink, by defining how often or for how long the device is actively receiving or transmitting. Thus, for example, changing to a longer on-duration for DTX and/or DRX is thus understood as moving to a higher-level of activity, i.e., moving to a higher activity state. Conversely, a "reduced activity state" can be understood as being a relative term. For example, if the current D2D activity state of the wireless device 12 is defined by a given discontinuous operation configuration—on-durations, cycle times, etc.— then a reduced-activity state would have, for example, shorter on-durations and/or longer cycle times between the on state.

More broadly, in the receiver context, a reduced-activity state is any state or configuration of the wireless device 12 where it is not expected to be continuously active and monitoring certain channels or signals. The same connotation holds for the transmit context, where a reduced activity state means that the device 12 is not transmitting at all times or occasions that it would during a state of full or normal activity.

During reduced activity states, the device 12 generally will consume less power, e.g., by turning off or less-frequently using its receiver and/or transmitter circuitry, along with corresponding processing circuits. Note also that the reduced activity state may be specific to the particular Radio Access Technology, RAT, at issue. In another example, the wireless device 12 may be in a reduced-activity state with respect to one type of communications or reception, but not with respect to another. For example, the wireless device 12 may be operating its cellular communication receiver and/or transmitter in a reduced-activity state, while operating a GPS or other receiver in a fully active state.

In any case, the method 800 further includes determining (Block 804) a D2D activity state adjustment for the first wireless device 12-1. This determination is undertaken responsive to the step of identifying carried out in Block 802. The method 800 correspondingly includes controlling (Block 806) the D2D activity state of the first wireless device 12-1 according to the determined activity state.

By way of example, the controlling step 806 comprises sending an explicit or implicit signal sent directly or indirectly to the wireless device 12-1, which is understood by the wireless device 12-1 as being an indication of the need to adjust its D2D activity state, e.g., to change to some predefined state or level with respect to D2D communications. As another example, the control action may be to send signaling indicating a specific activity-state configuration or activity-state parameters to be adopted by the wireless device 12.

In some embodiments of the method 800, determining the D2D activity state adjustment comprises determining that the first wireless device 12-1 should change from an existing state of reduced activity with respect to D2D operation, to an active state, i.e., fully active, or at least to a state of increased D2D activity. In one example, determining the D2D activity state adjustment comprises determining a DRX adjustment for the first wireless device 12-1. The DRX adjustment at issue here increases a reception activity state of the first wireless device 12-1 with respect to D2D communications. That is, the wireless device 12-1 becomes more active in the D2D context because its receiver is enabled for D2D reception more frequently or for longer durations.

In another example, determining the D2D activity state adjustment comprises determining a change for the first wireless device 12-1 from an existing D2D activity state to a state of increased D2D activity, such as turning on D2D communications, changing from DRX sleep to DRX active, from periodic activity to continuous activity, from less frequent activity periods to more frequent activity periods, from shorter active periods to longer active periods, or from a DRX cycle of longer length to a DRX cycle of a shorter length.

In some embodiments of the method 800, controlling the D2D activity state of the first wireless device 12-1 according to the determined D2D activity state adjustment comprises sending a pre-defined indication to the first wireless device 12-1 that is recognized by the first wireless device 12-1 as an indication to activate D2D communications, or at least to change to a more active state with respect to D2D operation. In another example, controlling the activity state of the first wireless device 12-1 according to the determined D2D activity state adjustment comprises indicating one or more activity state parameters to be adopted by the first wireless device 12-1.

In some embodiments of the method 800, detecting the current or pending D2D transmission by the second wireless device 12-2 is based on any one or more of: receiving an indication of the current or pending D2D transmission from another network node in the wireless communication network; receiving or detecting a request for a resource allocation for the D2D transmission or a scheduling request for the D2D transmission; receiving a buffer status report for the second wireless device 12-2; receiving a message indicating that the second wireless device 12-2 is transmitting, may transmit or will transmit in the D2D sense; determining from scheduling information that the D2D transmission is pending; receiving an indication directly or indirectly from the second wireless device 12-2 that it is transmitting the D2D transmission, or will transmit the D2D transmission; determining from a detected or pre-defined, known transmission pattern that a current or future time is or will be used by the second wireless device 12-2 for D2D transmissions; and determining that the second wireless device 12-2 makes D2D transmissions with a certain periodicity, e.g., over K subframes or L time units every M radio frames.

In another example covering one or more embodiments of the method 800, identifying the first wireless device 12-1 as a target for the D2D activity state control comprises determining that the first wireless device 12-1 previously indicated to the wireless communication network an interest in receiving D2D transmissions of at least a certain type. The identifying step may further comprise determining that the first wireless device 12-1 is currently operating in a reduced-activity state that will or could prevent it from receiving a current or pending D2D transmission by the second wireless device 12-2.

Still further, the identifying step 802 of the method 800 may include any one or more of: determining that a current or pending D2D transmission by the second wireless device 12-2 is of the certain type that the first wireless device 12-1 indicated an interest in receiving, and determining that the current or pending D2D transmission is of a predefined type that wireless devices 12 are by default intended to receive. These cases will be understood as examples of determining that a current or pending D2D transmission by a second wireless device 12-2 is or may be of interest to a first wireless device 12-1, and correspondingly adjusting the D2D activity state of the first wireless device 12-1.

Turning back to examples of determining the D2D activity state adjustment, in one or more embodiments of the method 800, step 804 comprises determining that the first wireless device 12-1 currently is in an active state and should remain in the active state in view of the current or pending D2D transmission, or comprises determining that the first wireless device currently is in a reduced-activity state and should change to a state of increased activity.

In a particular but non-limiting example, determining the D2D activity state adjustment comprises, in a case where the first wireless device 12-1 is in a reduced-activity state in which the first wireless device 12-1 is less active with respect to D2D communications than when the first wireless device 12-1 operates in the active state, i.e., fully active, determining that the first wireless device 12-1 should be returned to the active state, or at least changed to a state of increased activity as compared to its current reduced-activity state. Correspondingly, the step of controlling the activity state of the first wireless device 12-1 according to the determined D2D activity state adjustment comprises performing a control action that changes the first wireless device 12-1 to the active state or to the state of increased activity.

Thus, as used herein, the term "adjustment" encompasses changing the duration of active state operation, including prospectively changing the duration. For example, the first wireless device 12-1 may be in the active state with respect to D2D operation but set to return to an inactive or reduced-activity state upon expiration of its currently-running inactivity timer. The expiration time can therefore be "adjusted" by triggering a reset of the device's inactivity timer, such as by transmitting control signaling towards the device.

In the same or other embodiments, controlling the D2D activity state of the first wireless device 12-1 according to the determined D2D activity state adjustment comprises transmitting a physical channel to the first wireless device 12-1. In an example arrangement, transmitting the physical channel to the first wireless device 12-1 triggers resetting of an inactivity timer in the first wireless device 12-1, thereby triggering or extending active-state operation by the first wireless device 12-1.

Further, in at least one such implementation, the physical channel as transmitted to the first wireless device 12-1 includes at least some control information related to D2D operation of the first wireless device 12-1. Such control information may be any one or more of: a time-domain pattern for a scheduling assignment and/or for D2D data transmission, D2D transmitter information, D2D transmission type or content information, and D2D transmission configuration, such as transmit power, periodicity, bandwidth, and frequency resources.

Figure 9:
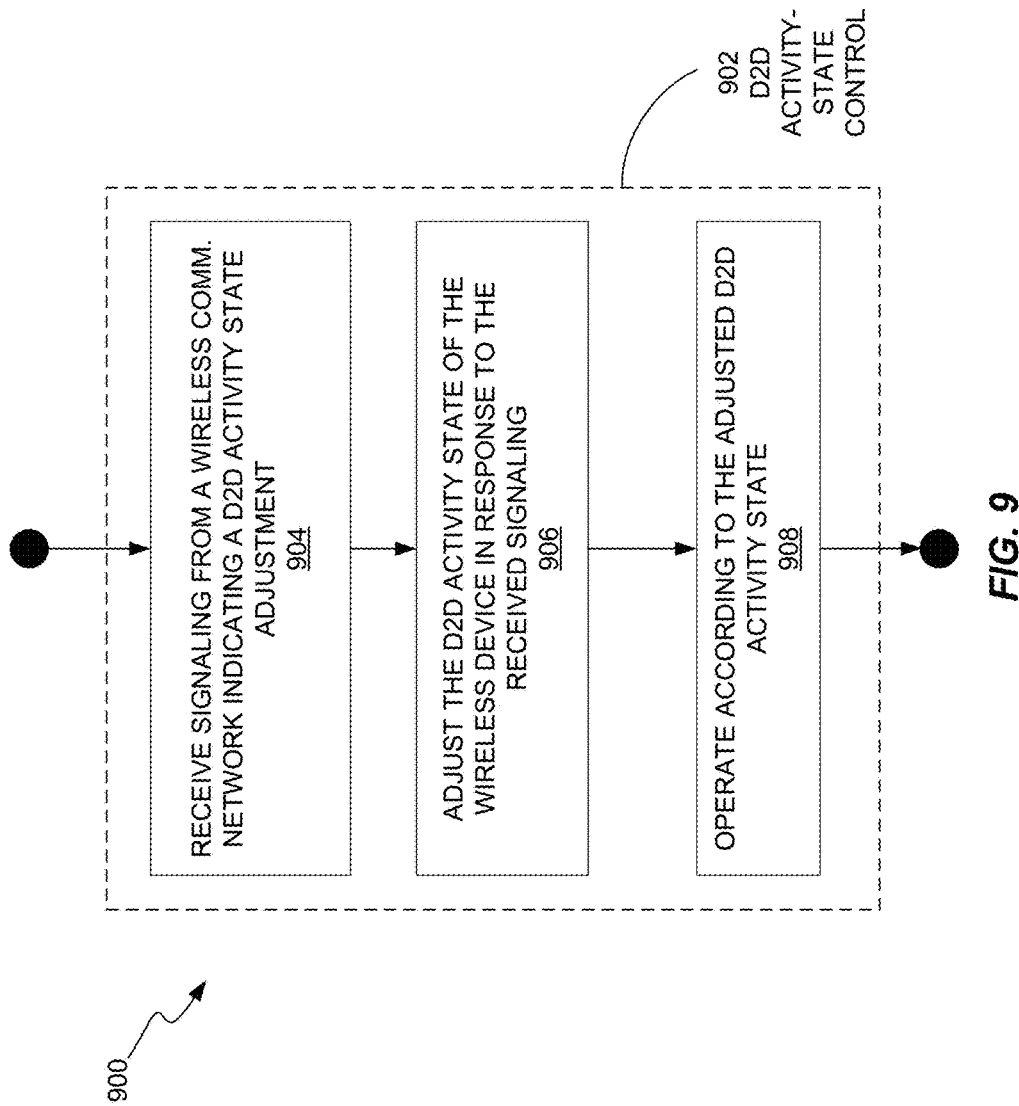
FIG. 9 is a logic flow diagram of one embodiment of a method of processing at a wireless device, for controlling the activity state of the wireless device with respect to D2D communications.

FIG. 9 illustrates a complementary device-side method 900, which in an example embodiment is implemented by a wireless device 12. The method 900 broadly includes controlling (Block 902) a D2D activity state of the wireless device 12, including operating in different activity states with respect to D2D operation at the wireless device 12. The different D2D activity states—i.e., the different levels of D2D activity—allow selective reduction in power consumption at the wireless device 12, such as by altering the amount of time that the receiver and/or transmitter of the wireless device 12 is/are enabled for D2D communications.

According to the teachings herein, this overall or ongoing D2D activity state control at the wireless device 12 includes receiving (Block 904) signaling indicating a D2D activity state adjustment for the wireless device 12. The method 900 further includes adjusting (Block 906) the D2D activity state of the wireless device 12, in response to receiving the signaling, and operating (Block 908) according to the adjusted D2D activity state.

In one example, the received signaling comprises an indication of the need for the wireless device 12 to increase its level of D2D activity, i.e., to change to the fully active state, or at least change to a more active state. Here, adjusting the D2D activity state of the wireless device 12 in response to the received signaling comprises making predefined changes to one or more activity state parameters that affect D2D operation at the wireless device 12. For example, in some embodiments of the method 900, the received signaling indicates an activity state configuration to be adopted by the wireless device 12 and the step of adjusting the activity state of the wireless device 12 in response to the received signaling comprises changing activity state parameters as needed to conform to the indicated activity state configuration.

In one or more embodiments, there are a number of predefined activity state settings that determine the D2D activity level of the wireless device 12, and the received signaling indicates one of the predefined activity state settings.

In an example case, the received signaling is received while the wireless device 12 is operating in a reduced-activity state with respect to D2D operation and indicates the need for increased D2D activity. Correspondingly, adjusting the D2D activity state of the wireless device 12 comprises changing one or more activity state parameters of the wireless device 12 in response to the received signaling, to increase the D2D activity state of the wireless device 12, e.g., to increase its level of activity with respect to D2D communications.

In a non-limiting example, the network node 10-1 determines a periodicity or other timing pattern of D2D transmissions by one or more other wireless devices 12, and it indicates this timing to the wireless device 12-1, or otherwise indicates a DRX or other activity-state control parameter whose value is set in dependence on such timing. In response, the wireless device 12-1 adapts its D2D activity state with respect to D2D communications, so that it is in a higher activity state at the time or times corresponding to the periodicity or other timing pattern of the D2D transmissions by the one or more other wireless devices 12.

Here, a "higher activity state" is a relative term and it encompasses full-on, active or awake states at the wireless device 12-1 where its receiver 20-1 and/or transmitter 20-2 are on. The term more broadly encompasses any D2D radio link monitoring state that is more active than the activity state existing at the wireless device 12-1 when the indication of the need for a higher activity state is received from the network.

A notable aspect, then, is that the wireless device 12-1 can be allowed to enter or can be placed into periods of inactivity or reduced D2D activity, while the wireless communication network in some sense keeps watch for D2D operations by other wireless devices 12 that are or may be of interest to the wireless device 12-1. Advantageously, the wireless communication network can detect current or pending D2D transmissions within the current serving cell(s) of the wireless device 12-1, as well as current or pending D2D transmissions in other cells, e.g., neighboring cells of the device's current serving cell. Here, "detect" should be construed broadly to include actual detection of the D2D operation(s), and to further include being told about such operations by another node, or recognizing that a resource allocation or other event implies that such operations are being or will be conducted.

Regardless, with the above arrangement, the wireless communication network can intelligently control the D2D activity state of any given wireless device 12 with respect to current or pending D2D transmissions by other wireless devices 12. In particular, the wireless communication network can send indications as needed, to targeted wireless devices 12 of the need to increase their D2D activity states. This "need" can be determined based on the express interests of the target wireless devices 12, such as where the wireless devices 12 are configured to indicate to the wireless communication network the particular types of D2D signals that are of interest to them.

In an example case, the wireless communication network detects a current or pending D2D transmission of a certain type, and it carries out the following example processing: (a) determine whether there are any wireless devices 12 proximate to the device(s) 12 conducting the current or pending D2D transmission, (b) determine whether any of those proximate wireless devices 12 have registered an interest in the transmission type associated with the current or pending D2D transmission, (c) determine whether any of those proximate and "interested" wireless devices 12 are operating in a reduced-activity state which would or might interfere with their ability to receive the current or pending D2D transmission, and (d) send indications to any such reduced-activity wireless devices 12 of the need to increase their activity state with respect to D2D communications.

Figure 10:
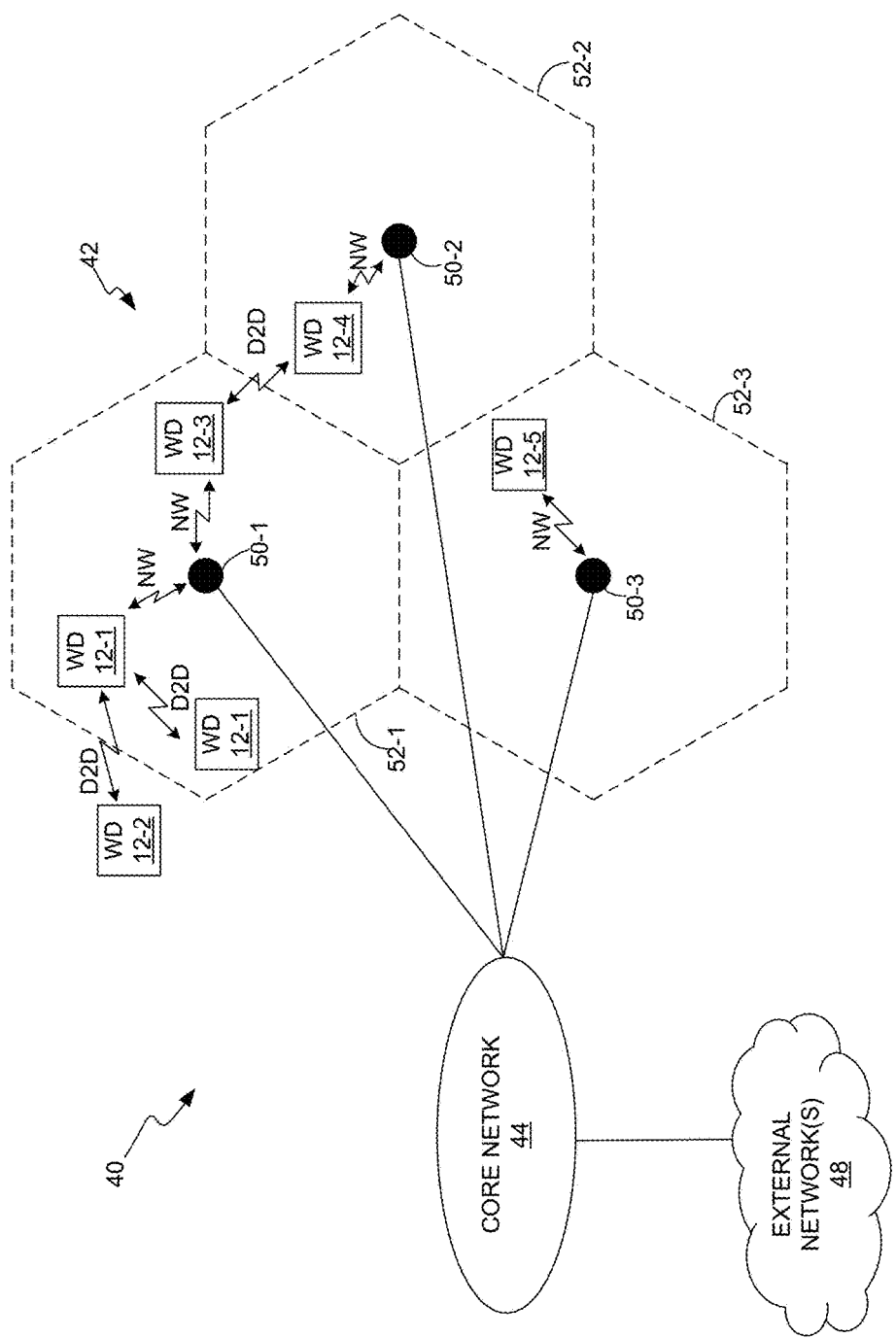
FIG. 10 is a block diagram for one embodiment of a wireless communication network, wherein a base station or other network node is configured to operate as the network node introduced in FIG. 6.

FIG. 10 illustrates an example wireless communication network 40 that includes a Radio Access Network (RAN) 42 and a Core Network (CN) 44. The network 40 communicatively couples wireless devices 12 to one or more external networks 48, such as the Internet or another packet data network. The diagram is simplified for ease of discussion and it will be appreciated that the network 40 may include additional examples of any one or more of the illustrated entities and may include other entities not illustrated. For example, the CN 44 may include Mobility Management Entities or MMEs, Serving Gateways or SGWs, a Packet Gateway or PGW, and one or more other nodes, such as positioning nodes, O&M nodes, etc.

The RAN 42 includes a number of base stations 50-1, 50-2 and 50-3, which in the LTE context are referred to as eNBs or eNodeBs. Unless suffixes are needed for clarity, the reference number "50" will be used to refer to base stations in the singular and plural sense. Each base station 50 uses certain air interface resources—e.g., spectrum, carriers, channels, etc.—to provide service over a given area, referred to as a "cell." Accordingly, in FIG. 10, the base station 50-1 provides a cell 52-1, the base station 50-2 provides a cell 52-2, and the base station 50-3 provides a cell 52-3. Unless suffixes are needed for clarity, the reference number "52" will be used herein to refer to cells in the singular and plural sense.

Of course, a given base station 50 may provide more than one cell 52, e.g., in the case of multi-carrier operation, and the teachings herein are not limited to arrangement of base stations 50 and cells 52 depicted in FIG. 10. For example, the cell sizes may be adaptive or non-uniform. In the latter case, the network 40 may comprise a heterogeneous network where one or more large cells, referred to as "macro" cells are overlaid by one or more smaller cells, referred to a "micro," "pico," or "femto," cells. These smaller cells are provided by low-power access points and may be used as service hotspots that provide higher data rate services and/or may be used to extend or fill in the service coverage provided by the macro cells. In some heterogeneous deployments, the micro cells use the same radio access technology used by the macro cells, e.g., LTE-based micro cells overlaying LTE-based macro cells.

In some embodiments of the wireless communication network 40, one or more of the base stations 50 operate as the aforementioned network node 10 or 10-1. That is, any given one or ones of the base stations 50 are configured to determine the need for a D2D activity state adjustment at one or more wireless devices 12 with respect to a current or pending D2D transmission by another wireless device 12, and, in response, to send signaling to increase the D2D activity state of such wireless devices 12. In a non-limiting example, a base station 50 identifies a first wireless device 12-1 as being a target for activity state control with respect to a current or pending D2D transmission by a wireless device 12-2, determines a D2D activity adjustment for the first wireless device 12-2, and takes a control action, to control the D2D activity state of the first according to the determined D2D activity state adjustment. The control action is, for example, sending a signal to the first wireless device 12-1, directly or indirectly, where that signal indicates the need for D2D activity adjustment.

The control signal in some embodiments triggers a default adjustment, such as by triggering the first wireless device 12-1 to change to a fully active state with respect to D2D operations, or to change to a predefined higher level of D2D activity—e.g., a predefined activity level for D2D reception. In one or more other embodiments, the control signal indicates the express adjustment(s) to be made. For example, a base station 50 transmits a physical control channel or other control signal to a first wireless device 12-1, wherein the physical channel includes control information indicating at least one of: one or more configuration settings for configuring D2D operation by the first wireless device 12-1, and information about a current or pending D2D transmission by the second wireless device 12-2, for use by the first wireless device 12-1 in configuring D2D operation by the first wireless device 12-1.

The target identification may be based on, for example, the base station 50 knowing that the wireless device 12-1 is interested in receiving a type of D2D communications and detecting that (a) the wireless device 12-1 is currently in a reduced-activity state with respect to D2D communications in combination with detecting that a second wireless device 12-2 is currently transmitting, or will transmit, a D2D transmission of a type matching the interests of the first wireless device 12-1. Additionally, or alternatively, the D2D transmission in question may be a type that by default should be received by all D2D-capable wireless devices 12, e.g., a public safety signal.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method implemented by a network node in a wireless communications network, the method comprising:
   determining that a first wireless device registered in the wireless communications network is a target of a pending Device-to-Device (D2D) transmission by a second wireless device that is registered in the wireless communications network;
   determining a D2D activity state adjustment for the first wireless device to make the first wireless device active for D2D reception at a time corresponding to the pending D2D transmission; and
   sending configuration information to the first wireless device corresponding to the determined D2D activity state adjustment;
   wherein determining that the first wireless device is a target of the pending D2D transmission comprises determining that the first wireless device previously indicated to the wireless communications network an interest in receiving D2D transmissions of at least a certain type.

2. The method of claim 1, wherein determining the D2D activity state adjustment comprises determining a Discontinuous Reception (DRX) adjustment for the first wireless device, wherein the DRX adjustment increases a reception activity state of the first wireless device with respect to D2D communications.

3. The method of claim 1, wherein determining the D2D activity state adjustment comprises determining a change for the first wireless device from an existing D2D activity state to a more active D2D activity state.

4. The method of claim 1, wherein the configuration information indicates one or more activity state parameters to be adopted by the first wireless device for D2D operation.

5. The method of claim 1, further comprising detecting the pending D2D transmission by the second wireless device based on receiving an indication of the pending D2D transmission from another network node in the wireless communications network.

6. A method implemented by a network node in a wireless communications network, the method comprising:
   determining that a first wireless device registered in the wireless communications network is a target of a pending Device-to-Device (D2D) transmission by a second wireless device that is registered in the wireless communications network;
   determining a D2D activity state adjustment for the first wireless device to make the first wireless device active for D2D reception at a time corresponding to the pending D2D transmission; and
   sending configuration information to the first wireless device corresponding to the determined D2D activity state adjustment;
   wherein determining that the first wireless device is a target of the pending D2D transmission comprises determining that the pending D2D transmission is of a predefined type that wireless devices are by default intended to receive.

7. A network node configured for operations in a wireless communications network, said network node comprising:
   a communication interface configured for communicating with at least one of: wireless devices operating in the wireless communications network and one or more other network nodes in the wireless communications network, wherein at least one such other network node is configured for communicating directly or indirectly with wireless devices operating in the wireless communications network; and
   a processing circuit operatively associated with the communication interface and configured to:
      determine that a first wireless device in the wireless communications network is a target of a pending Device-to-Device (D2D) transmission by a second wireless device that is registered in the wireless communications network;
      determine a D2D activity state adjustment for the first wireless device to make the first wireless device active for D2D reception at a time corresponding to the pending D2D transmission; and
      send configuration information to the first wireless device corresponding to the determined D2D activity state adjustment;
   wherein the processing circuit is configured to determine that the first wireless device is a target of the pending D2D transmission based on determining that the first wireless device previously indicated to the wireless communications network an interest in receiving D2D transmissions of at least a certain type.

8. The network node of claim 7, wherein the network node comprises a radio base station configured for operation in the wireless communications network, and wherein the communication interface comprises radio transceiver circuitry, and wherein the processing circuit is configured to send the configuration information to the first wireless device via the radio transceiver circuitry.

9. The network node of claim 7, wherein the processing circuit is configured to determine the D2D activity state adjustment by determining a Discontinuous Reception (DRX) adjustment for the first wireless device, wherein the DRX adjustment increases a reception activity state of the first wireless device with respect to D2D communications.

10. A network node configured for operations in a wireless communications network, said network node comprising:
   a communication interface configured for communicating with at least one of: wireless devices operating in the wireless communications network and one or more other network nodes in the wireless communications network, wherein at least one such other network node is configured for communicating directly or indirectly with wireless devices operating in the wireless communications network; and
   a processing circuit operatively associated with the communication interface and configured to:
      determine that a first wireless device in the wireless communications network is a target of a pending Device-to-Device (D2D) transmission by a second wireless device that is registered in the wireless communications network;
      determine a D2D activity state adjustment for the first wireless device to make the first wireless device active for D2D reception at a time corresponding to the pending D2D transmission; and
      send configuration information to the first wireless device corresponding to the determined D2D activity state adjustment;
   wherein the processing circuit is configured to determine that the first wireless device is a target of the pending D2D transmission based on determining that the pending D2D transmission is of a predefined type that wireless devices are by default intended to receive.

* * * * *